(12) United States Patent
Osamura et al.

(10) Patent No.: US 8,228,521 B2
(45) Date of Patent: Jul. 24, 2012

(54) DATA PROCESSING APPARATUS, PRINTING SYSTEM, JOB EXECUTION SYSTEM, AND JOB EXECUTION METHOD

(75) Inventors: Toru Osamura, Kanagawa (JP); Hitoshi Tsushima, Kanagawa (JP); Takashi Sakayama, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 1096 days.

(21) Appl. No.: 11/588,254

(22) Filed: Oct. 27, 2006

(65) Prior Publication Data

US 2007/0216935 A1 Sep. 20, 2007

(30) Foreign Application Priority Data

Mar. 17, 2006 (JP) ................................ 2006-074516
Mar. 17, 2006 (JP) ................................ 2006-074517

(51) Int. Cl.
*G06K 15/00* (2006.01)
(52) U.S. Cl. ............... 358/1.14; 358/1.15; 358/1.13; 358/434; 358/405; 709/219; 709/225; 709/227; 709/228; 702/187; 702/188
(58) Field of Classification Search ............... 358/1.14, 358/1.15, 1.13, 434, 405; 709/219, 225, 709/227, 228; 702/187, 188
See application file for complete search history.

(56) References Cited

U.S. PATENT DOCUMENTS

| | | | | |
|---|---|---|---|---|
| 6,466,748 B2 * | 10/2002 | Tamai et al. | ................. | 399/16 |
| 6,791,703 B1 * | 9/2004 | Maeda et al. | ................. | 358/1.15 |
| 2002/0059372 A1 * | 5/2002 | Goshev et al. | ................. | 709/203 |
| 2003/0004988 A1 * | 1/2003 | Hirasawa et al. | ............. | 707/502 |
| 2003/0081250 A1 | 5/2003 | Kimura | | |
| 2003/0197885 A1 | 10/2003 | Takeo | | |
| 2005/0039025 A1 * | 2/2005 | Main et al. | ................. | 713/182 |
| 2005/0080906 A1 * | 4/2005 | Pedersen | ................. | 709/228 |
| 2005/0254087 A1 | 11/2005 | Aiyama et al. | | |

FOREIGN PATENT DOCUMENTS

| | | | | |
|---|---|---|---|---|
| JP | A 11-134125 | | | 5/1999 |
| JP | A-2000-215019 | | | 8/2000 |
| JP | 2001067191 | A | * | 3/2001 |
| JP | A-2002-278732 | | | 9/2002 |
| JP | A-2002-351831 | | | 12/2002 |
| JP | A-2003-202972 | | | 7/2003 |
| JP | A-2003-316458 | | | 11/2003 |
| JP | A-2005-065200 | | | 3/2005 |
| JP | A 2005-254513 | | | 9/2005 |
| JP | A-2006-025137 | | | 1/2006 |

OTHER PUBLICATIONS

Dec. 21, 2010 Office Action issued in Japanese Patent Application No. 2006-074516 (with translation).

* cited by examiner

*Primary Examiner* — Jacky X Zheng

(74) *Attorney, Agent, or Firm* — Oliff & Berridge, PLC

(57) ABSTRACT

An image forming apparatus includes an authentication unit that authenticates an authorized user; a ticket generating unit that generates a job execution ticket including conditions for allowing execution of a job, a data acquiring unit that outputs the job execution ticket and an acquirement request for data selected by the authorized user who logs in through authentication, to a server device that is connected to a network; and a controller that allows processing of the data under the conditions even after the authorized user logs out, when the data having the job execution ticket attached thereto is received within a predetermined period of time since the log-out.

5 Claims, 19 Drawing Sheets

FIG. 16

| JOB IDENTIFIER | REQUEST ISSUANCE TIME |
|---|---|
| JobID0001 | 19:22 |
| JobID0002 | 19:39 |
| JobID0005 | 20:04 |
| NULL | NULL |
| NULL | NULL |

FIG. 18

| JOB IDENTIFIER | REQUEST ISSUANCE TIME | ALLOWANCE TIME |
|---|---|---|
| JobID0001 | 19:22 | 10 MINUTES |
| JobID0002 | 19:39 | 5 MINUTES |
| JobID0005 | 20:04 | 60 MINUTES |
| NULL | NULL | NULL |
| NULL | NULL | NULL |

FIG. 20

| JOB IDENTIFIER | REQUEST ISSUANCE TIME | ALLOWANCE TIME |
|---|---|---|
| JobID0001 | 19:22 | 10 MINUTES |
| JobID0002 | 19:39 | 5 MINUTES → REWRITTEN TO NULL |
| JobID0005 | 20:04 | 60 MINUTES |
| NULL | NULL | NULL |
| NULL | NULL | NULL |

FIG. 21

| JOB IDENTIFIER | REQUEST ISSUANCE TIME |
|---|---|
| JobID0001 | 19:22 |
| JobID0002 | 19:39 → 19:42 → 19:44 |
| JobID0005 | 20:04 |
| NULL | NULL |
| NULL | NULL |

FIG. 22

| JOB IDENTIFIER | REQUEST ISSUANCE TIME | ALLOWANCE TIME |
|---|---|---|
| JobID0001 | 19:22 | 10 MINUTES |
| JobID0002 | 19:39 | 5 MINUTES → 20 MINUTES |
| JobID0005 | 20:04 | 6 MINUTES |
| NULL | NULL | NULL |
| NULL | NULL | NULL |

DATA PROCESSING APPARATUS, PRINTING SYSTEM, JOB EXECUTION SYSTEM, AND JOB EXECUTION METHOD

BACKGROUND

1. Technical Field

The present invention relates to a technique of performing a printing operation by transferring data such as text data or image data stored in an external server to an image forming apparatus.

2. Related Art

Conventionally, there have been techniques for performing printing operations by designating image data stored in a server device on a network through an operation panel of an image forming apparatus, and transferring the designated image data to the image forming apparatus.

When image data of a large size is to be transferred or a large amount of image data is to be collectively printed in such a system, a very long period of time is needed before the image data is sent to the image forming apparatus.

SUMMARY

An aspect of the present invention provides an image forming apparatus including: an authentication unit that authenticates an authorized user; a ticket generating unit that generates a job execution ticket containing conditions for allowing execution of a job; a data acquiring unit that outputs the job execution ticket and an acquirement request for data selected by the authorized user who logs in through authentication, to a server device that is connected to a network; and a controller that allows processing of the data under the conditions even after the authorized user logs out, when the data having the job execution ticket attached thereto is received within a predetermined period of time since the log-out.

BRIEF DESCRIPTION OF THE DRAWINGS

Embodiments of the present invention will be described in detail based on the following figures, wherein:

FIG. 16 shows the data structure of a table in the seventh exemplary embodiment;

FIG. 18 shows the data structure of a table in accordance with an eighth exemplary embodiment of the present invention;

FIG. 20 shows an example of the data structure of a table;

FIG. 21 shows another example of the data structure of a table; and

FIG. 22 shows yet another example of the data structure of a table.

DETAILED DESCRIPTION

A description will now be given, with reference to the accompanying drawings, of exemplary embodiments of the present invention.

(First Exemplary Embodiment)

Figure 1:
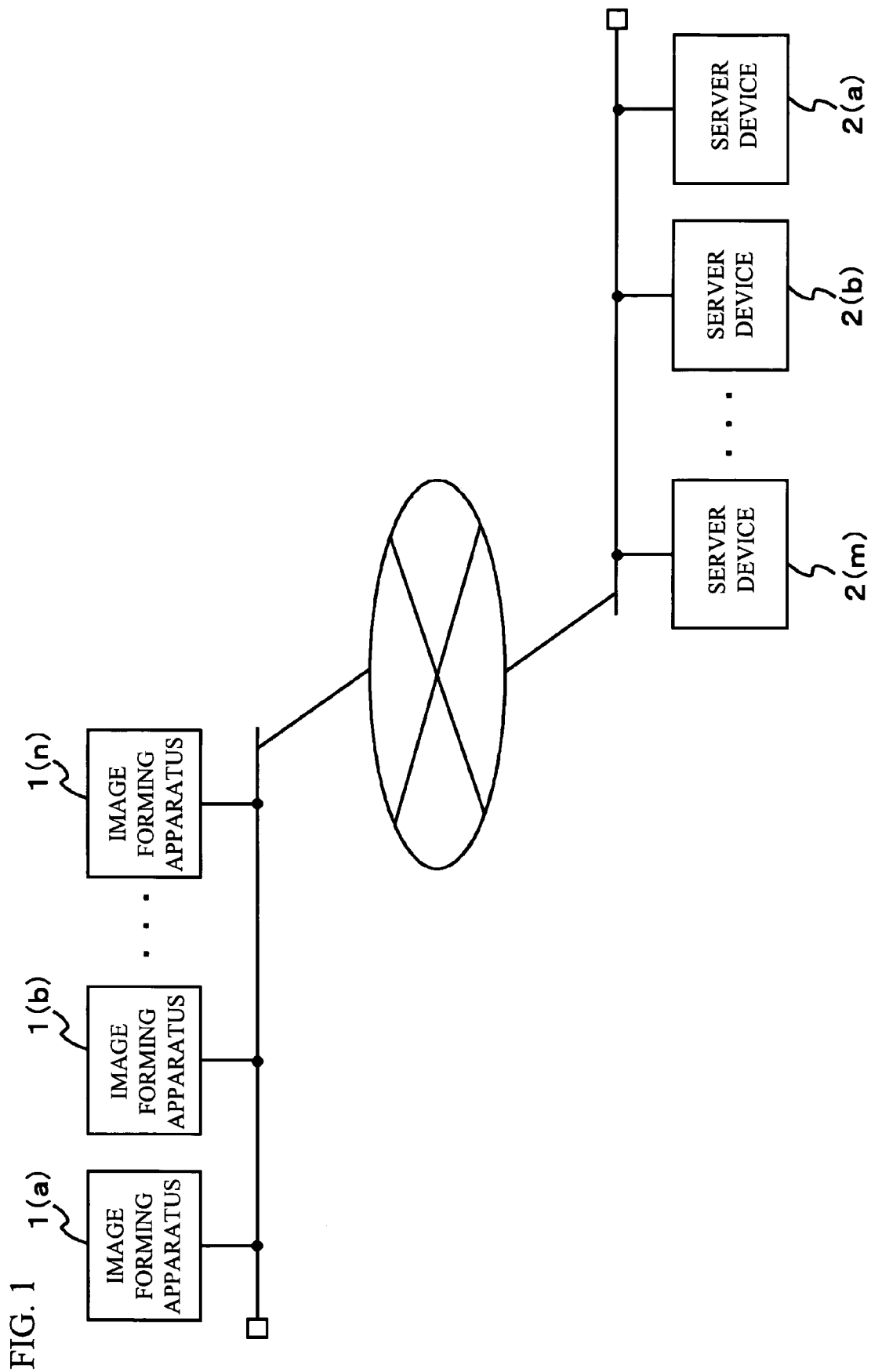
FIG. 1 illustrates the structure of a system in accordance with an aspect of the present invention.

FIG. 1 illustrates the structure of a system to which the present invention is applied. The system employed in this exemplary embodiment includes image forming apparatuses 1a, 1b, . . . 1n, and server devices 2a, 2b, . . . 2(m) that store image data and text data (n and m being given natural numbers). At least one image forming apparatuses 1 and at least one server devices 2 may be provided on the same network such as a LAN. Alternatively, the image forming apparatuses 1 may be provided on a LAN, while the server devices 2 are provided on an external network such as the Internet.

Figure 2:
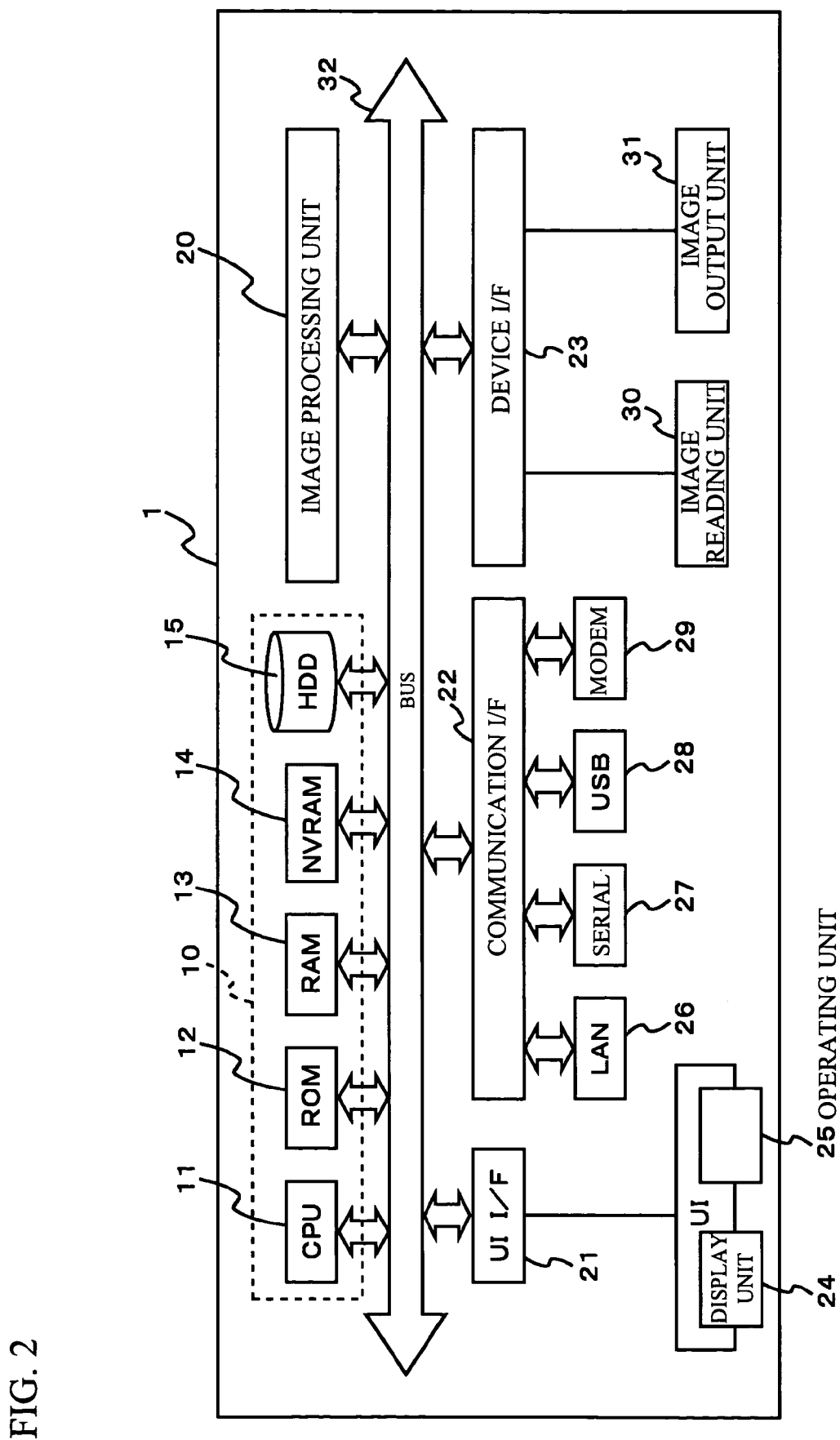
FIG. 2 is a block diagram illustrating the structure of an image forming apparatus in accordance with an aspect of the present invention.

FIG. 2 illustrates the structure of one of the image forming apparatuses 1. The image forming apparatus 1 has a controller 10, an image processing unit 20, a display unit 24, an operating unit 25, a LAN line 26, a serial line 27, a USB line 28, a modem 29, an image reading unit 30, and an image output unit 31 that are connected to a system bus 32. The display unit 24 and the operating unit 25 are connected to the system bus 32 via a UI (user interface) I/F 21. The LAN line 26, the serial line 27, the USB line 28, and the modem 29 are connected to the system bus 32 via a communication I/F 22. The image reading unit 30 and the image output unit 31 are connected to the system bus 32 via a device I/F 23.

The controller 10 includes a CPU 11, a ROM 12, a RAM 13, a NVRAM (Non-Volatile Random Access Memory) 14, and a HDD 15. The CPU 11 reads a program from the ROM 12, and performs a control operation in accordance with the program, so that the image forming apparatus 1 operates. The RAM 13 functions as a system memory when the CPU 11 performs operations, and as a page memory when the image processing unit 20 performs image operations. The NRAM 14 is a non-volatile memory that stores various setting parameters such as image quality adjusting parameters, and various kinds of history information. The HDD 15 stores image data and various kinds of history information. The operation of the controller 10 will be described later in detail.

The image processing unit 20 performs data expanding and contracting operations, and various image processing operations. The image reading unit 30 reads the image of a document placed on a document table. The image output unit 31 outputs a printed page of image data processed by the image processing unit 20. The display unit 24 is a display device such as a LCD (Liquid Crystal Display), and displays information necessary for the operator. The operating unit 25 sets operations to be performed by the image forming apparatus 1.

The LAN line 26 is a connecting unit with a network such as 10/100Base-T. The serial line 27 is connected to an external peripheral device with RS232C or the like. The USB line 28 is a connecting portion with a device compatible with USBs. The modem 29 connects with a public line such as a FAX line.

The system employed in this exemplary embodiment transmits a job execution ticket as well as a data acquirement request to the corresponding server device 2, when one image forming apparatus 1 in the system employed in this exemplary embodiment acquires and prints out image data or text data stored in the server device 2 in the network. When sending the requested data to the image forming apparatus 1, the server device 2 adds the job execution ticket to the data, and sends the data. Upon receipt of the data having the job execution ticket attached thereto, the image forming apparatus 1 determines whether the job execution ticket is an authentic ticket. If determining the job execution ticket is an authentic ticket, the image forming apparatus 1 executes the job and outputs data in a case where a predetermined period of time has not passed since log-out even if the user who requested the data acquirement has logged out of the system. The predetermined period of time can be arbitrarily set by the user through the operating unit 25.

Figure 3:
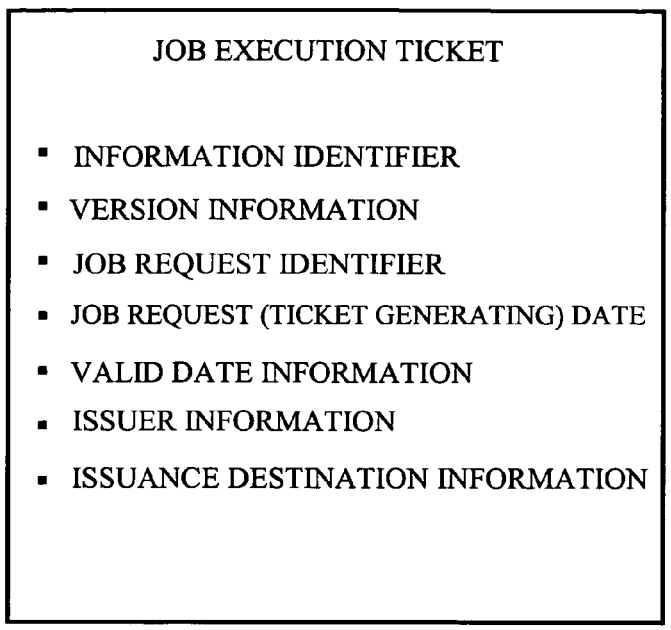
FIG. 3 shows the data structure of a job execution ticket in accordance with a first exemplary embodiment of the present invention.

The job execution ticket includes an information identifier, version information, a job request identifier, a job request (ticket generating) date, valid date information, issuer information, and issuance destination information, as shown in FIG. 3. The information identifier indicates the information that is allowed by the job execution ticket. In this exemplary embodiment, the information indicating that a printing job is allowed within a predetermined period of time after log-out is embedded in the information identifier. The version information indicates the version of the job execution ticket. The job request identifier identifies the acquirement request for each set of data in a case where more than one set of data is requested through one data acquirement request. The job request (ticket generating) date indicates the date on which the job execution ticket is generated, and is compared with the present date when the job execution ticket is returned from the server device 2 to the image forming apparatus 1. The valid date information indicates the date on which the job execution ticket is issued or the date on which the job execution ticket becomes invalid. The issuer information identifies the device that has issued the job execution ticket, and may be formed with a machine code and a serial number, for example. The issuance destination information indicates the user ID acquired from the operator (the user) at the time of log-in.

Figure 4:
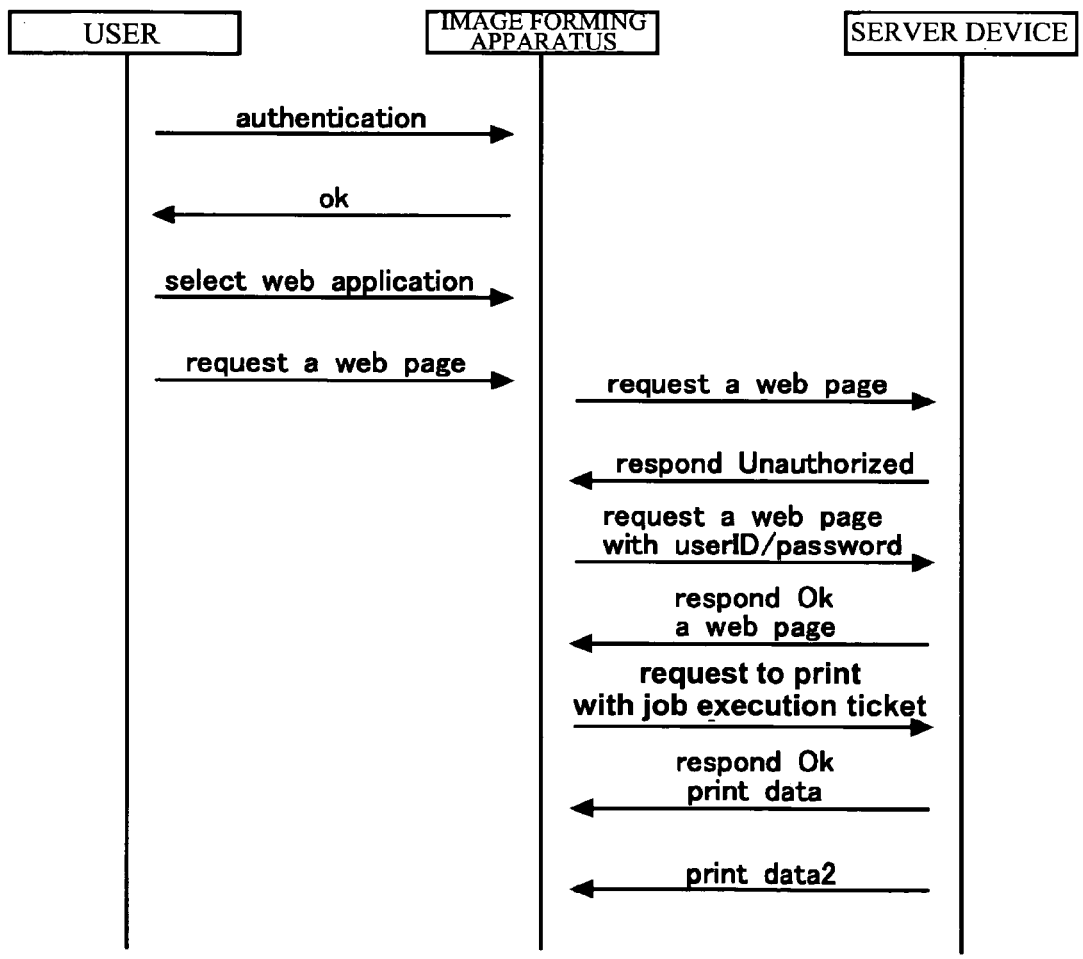
FIG. 4 shows the authentication procedures in an image forming apparatus, and a communication sequence to be carried out between the image forming apparatus and a server device in accordance with the first exemplary embodiment.

FIG. 4 shows the procedures for user authentication in an image forming apparatus 1 and a communication sequence to be carried out between the image forming apparatus 1 and the corresponding server device 2.

First, the procedures for authenticating the user are carried out in the image forming apparatus 1.

When a user ID and a password are input through the operating unit 25 for authentication, the controller 10 of the image forming apparatus 1 authenticates the user based on the input information. If the user is authenticated, a select signal for a web application ("select web application") is input, and an acquirement request for a Web page ("request a web page") is also input.

The controller 10 of the image forming apparatus 1 transmits the information as to the Web page that is input through the operating unit 25, to the server device 2 ("request a web page"). If the server device 2 requires authentication when accessed, an authentication failure notification is transmitted to the image forming apparatus 1 ("respond Unauthorized"). The image forming apparatus 1 transmits the user ID and the password input from the user as authentication information to the server device 2 ("request a web page with user ID/password").

If the user is successfully authorized in the server device 2, the Web page requested by the image forming apparatus 1 is transmitted to the image forming apparatus 1. The image forming apparatus 1 then outputs a print request for the Web page selected by the user, to the server device 2. A job execution ticket is attached to the request ("request to print with job execution ticket"). In response to the request from the image forming apparatus 1, the server device 2 transfers print data. The job execution ticket is also attached to the print data.

Figure 5:
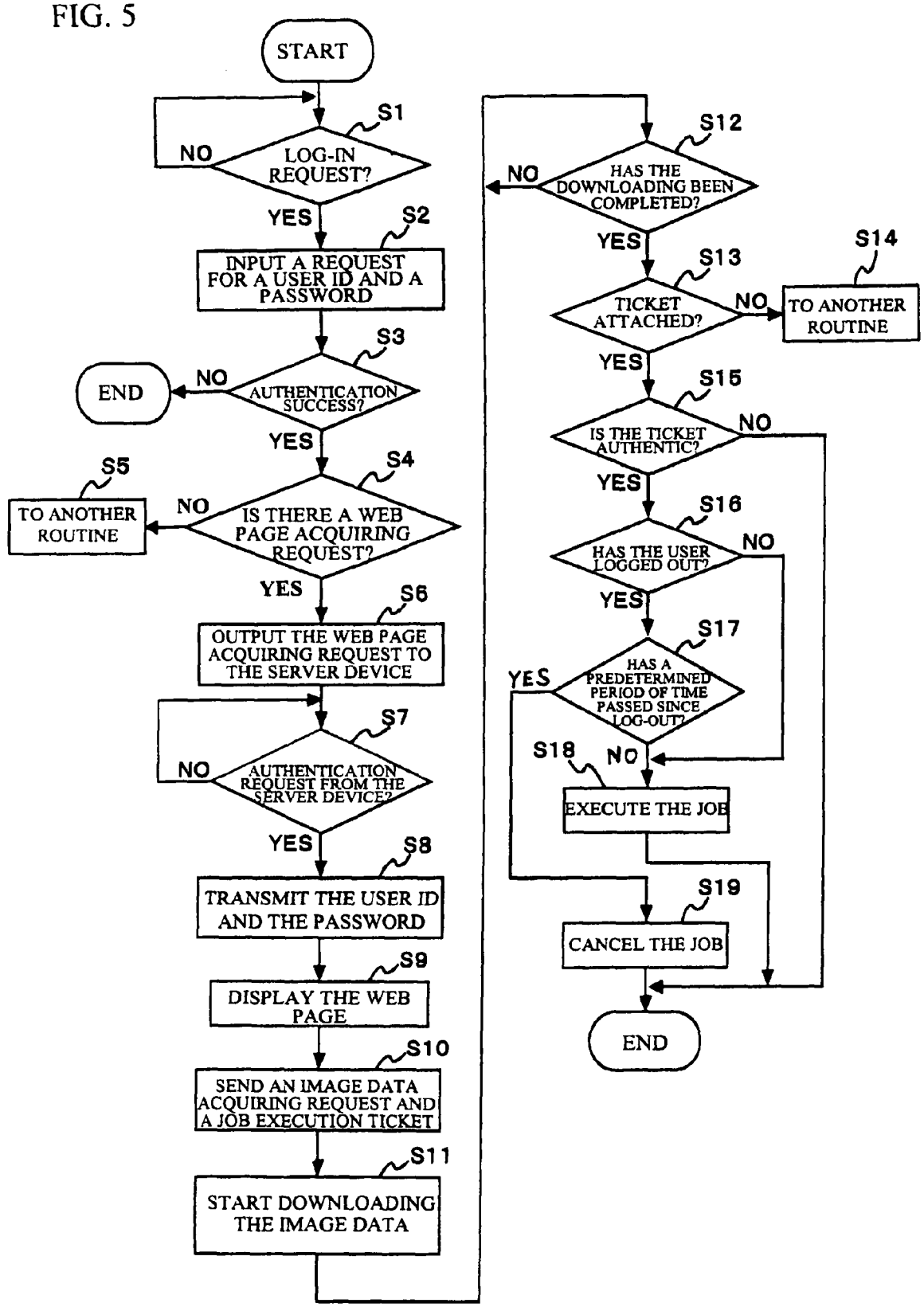
FIG. 5 is a flowchart showing the procedures in the operation to be performed by an image forming apparatus of the first exemplary embodiment.

Referring now to the flowchart shown in FIG. 5, the procedures in the operation to be performed by the image forming apparatus 1 are described.

When a log-in request is issued from the user operating the operating unit 25 ("YES" in step S1), the controller 10 causes the display unit 24 to display a message for requesting a password input (step S2). The controller 10 checks the user ID and the password that are input through the operating unit 25. If the user ID and the password are authenticated ("YES" in step S3), the controller 10 awaits a Web page acquirement request from the user (step S4). If the user ID and the password are not authenticated ("NO" in step S3), this operation comes to an end.

If there is a Web page acquirement request from the user ("YES" in step S4), the controller 10 accesses the server device 2 that provides the Web page (step S6). After the server device 2 is accessed, an authentication request is sent from the server device 2 ("YES" in step S7). In response to the request from the server device 2, the controller 10 transmits the user ID and the password that are input in step S2, to the server device 2 (step S8). If the user ID and the password are authenticated in the server device 2, the Web page designated by the controller 10 is displayed on the display unit 24 (step S9).

When the data to be acquired is selected by the user, the controller 10 attaches a job execution ticket to the identification information as to the selected data, and sends a data acquirement request to the server device 2 (step S10) The server device 2 transmits the requested data to the image forming apparatus 1. Here, the job execution ticket is also attached to the data to be transferred (step S11). The job execution ticket may be attached to every Web page request to be sent to the server device 2. There are cases where the controller 10 cannot determine whether the Web page request is a data acquirement request, and in such cases, the job execution ticket becomes necessary. If the Web page request is not a data acquirement request, the server device 2 discards the job execution ticket.

If the downloading of data is completed ("YES" in step S12), the controller 10 determines whether the job execution ticket is attached to the data (step S13). If the job execution ticket is not attached to the data, the operation moves on to another operation routine (step S14). If the job execution ticket is attached to the data, the controller 10 determines whether the attached ticket is an authentic ticket. Since the job execution ticket includes information such as valid date information, issuer information, and issuance destination information, the controller 10 determines whether the attached ticket is an authentic ticket based on the information. If the attached ticket is determined not to be an authentic job execution ticket ("NO" in step S15), the operation comes to an end. If the controller 10 determines that the attached ticket is an authentic job execution ticket ("YES" in step S15), the controller 10 determines whether the user, who has requested data transfer, has already logged out (step S16). If the user has already logged out ("YES" in step S16), the controller 10 determines whether a predetermined period of time has not passed since the log-out (step S17). If the predetermined period of time has not passed since the log-out ("YES" in step S17) or the user has not logged out ("NO" in step S16), the controller 10 prints out the data obtained from the server device 2, and executes the job (step S18). If the predetermined period of time has passed since the log-out ("NO" in step S17), the controller 10 cancels the job (step S19).

This embodiment is an exemplary embodiment of the present invention, but the present invention is not limited to this exemplary embodiment. Various changes and modifications may be made to this exemplary embodiment without departing from the scope of the invention. For example, in the above described embodiment, a print job is executed in cases where data is received within a predetermined period of time since the log-out of the user who has requested the data requirement. However, a print job may be executed in cases where data is received from the server device 2 within a predetermined period of time since a data acquirement request is output to the server device 2.

(Second Exemplary Embodiment)

Figure 6:
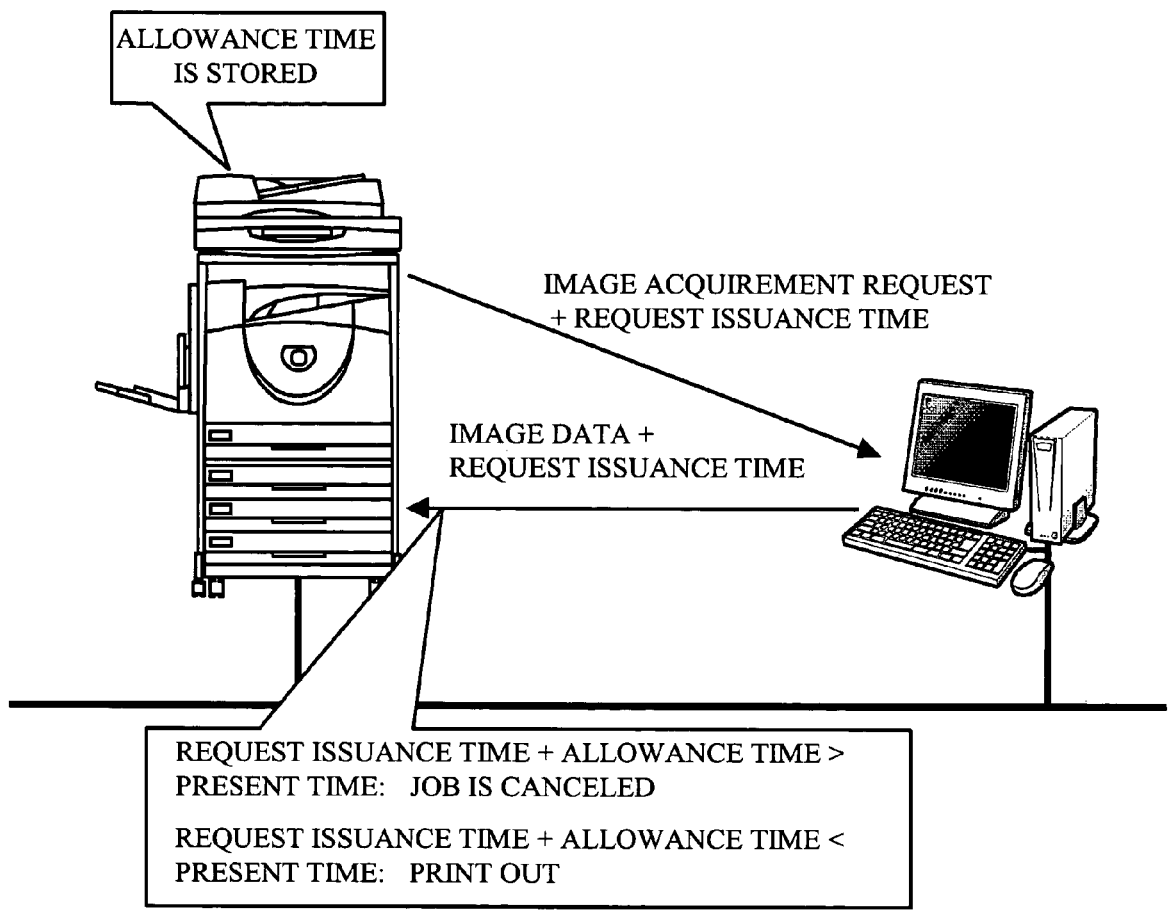
FIG. 6 schematically illustrates an operation in accordance with a second exemplary embodiment of the present invention.

In this exemplary embodiment, when an image forming apparatus 1 outputs an image data acquirement request to a server device 2, the image forming apparatus 1 also transmits information as to the time at which the request is output (the request issuance time), as shown in FIG. 6. Upon receipt of the requirement request, the server device 2 returns the requested image data and the request issuance time to the image forming apparatus 1. In the image forming apparatus 1, a period of time for allowing execution of a job after the output of the acquirement request (hereinafter, the period of time will be referred to as the allowance time) is set in advance. After receiving the image data, the image forming apparatus 1 adds the allowance time to the request issuance time returned from the server device 2. If the time shown after the addition is ahead of the present time, the job execution is cancelled. If the time shown after the addition is not ahead of the present time, the job is executed.

Figure 7:
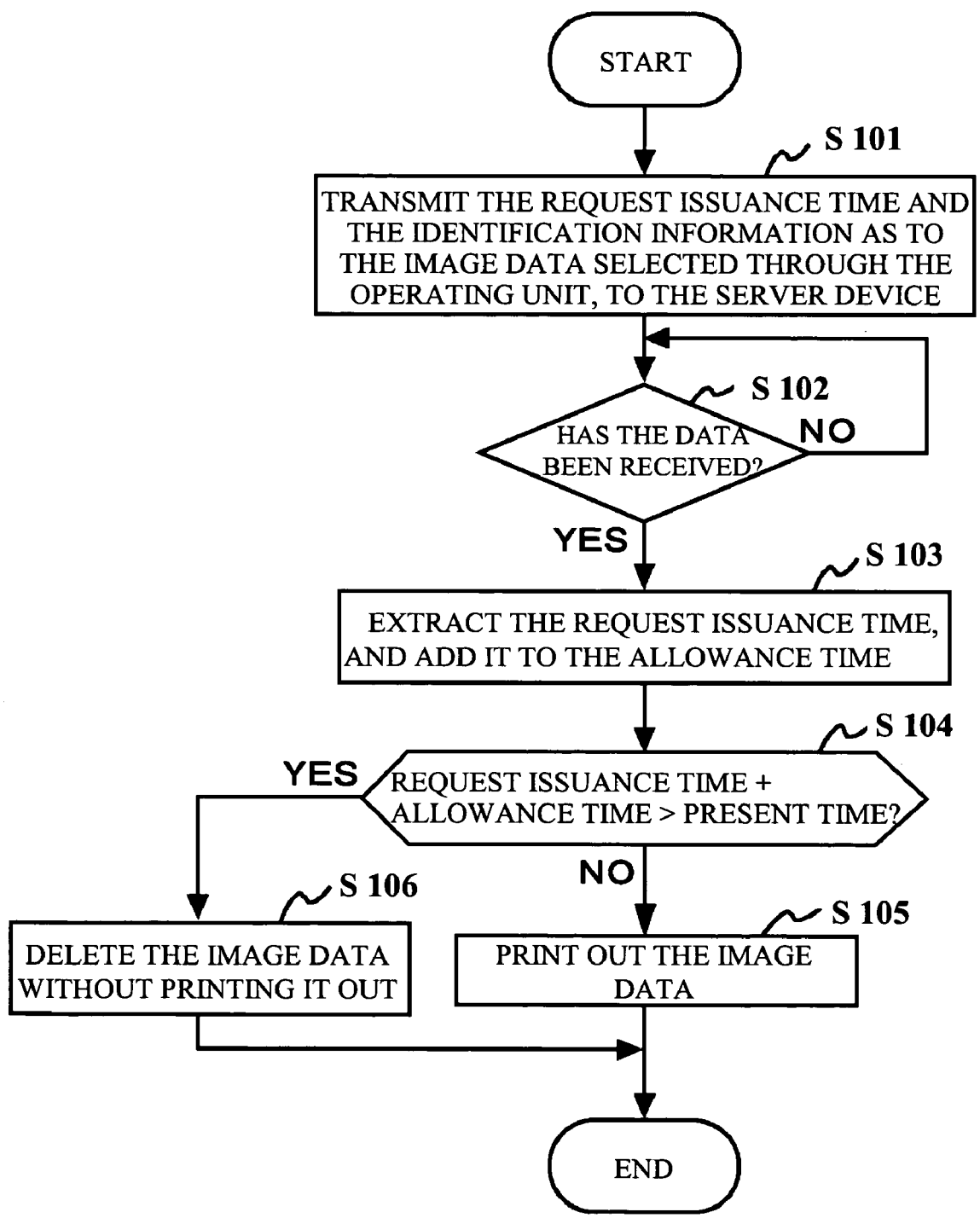
FIG. 7 is a flowchart showing the procedures in the operation in accordance with the second exemplary embodiment.

Referring now to the flowchart shown in FIG. 7, the procedures in an operation in accordance with this exemplary embodiment are described.

When image data stored in the server device 2 is selected through the operating unit 25 of the image forming apparatus 1 and a printing instruction for the image data is input, the controller 10 transmits an acquirement request including the identification information as to the selected image data and the present time information as the request issuance time, to the server device 2 (step S101).

In response to the image data acquirement request, the server device 2 transmits the requested image data and the request issuance time (the present time information), which is received from the image forming apparatus 1, to the image forming apparatus 1.

When the data is received from the server device 2 (step S102), the controller 10 extracts the request issuance time from the received data, and adds the request issuance time to a predetermined allowance time (step S103). The time obtained as a result of the addition is then compared with the present time. If the time obtained as the result of the addition is ahead of the present time ("YES" in step S104), the job is not executed but is canceled (step S106). If the time obtained as the result of the addition is not ahead of the present time ("NO" in step S104), the job is executed (step S105).

As described above, the information as to the time at which the data acquirement request is output is included in the data acquirement request and is transmitted to the server device 2 in this exemplary embodiment. The time obtained by adding the allowance time to the time information is compared with the present time, so as to determine whether the received data is to be printed out. Accordingly, determination whether data is to be printed out can be easily made, without the processes for detecting the origin of data and detecting the time at which the acquirement request is issued. Thus, the load on the image forming apparatus 1 can be reduced.

Also, with the printing allowance time being set, printing is not performed if a long time is needed before the downloading of data from the server device 2 is completed. Thus, the risk of a third person stealing a glance at the data can be eliminated.

(Third Exemplary Embodiment)

Figure 8:
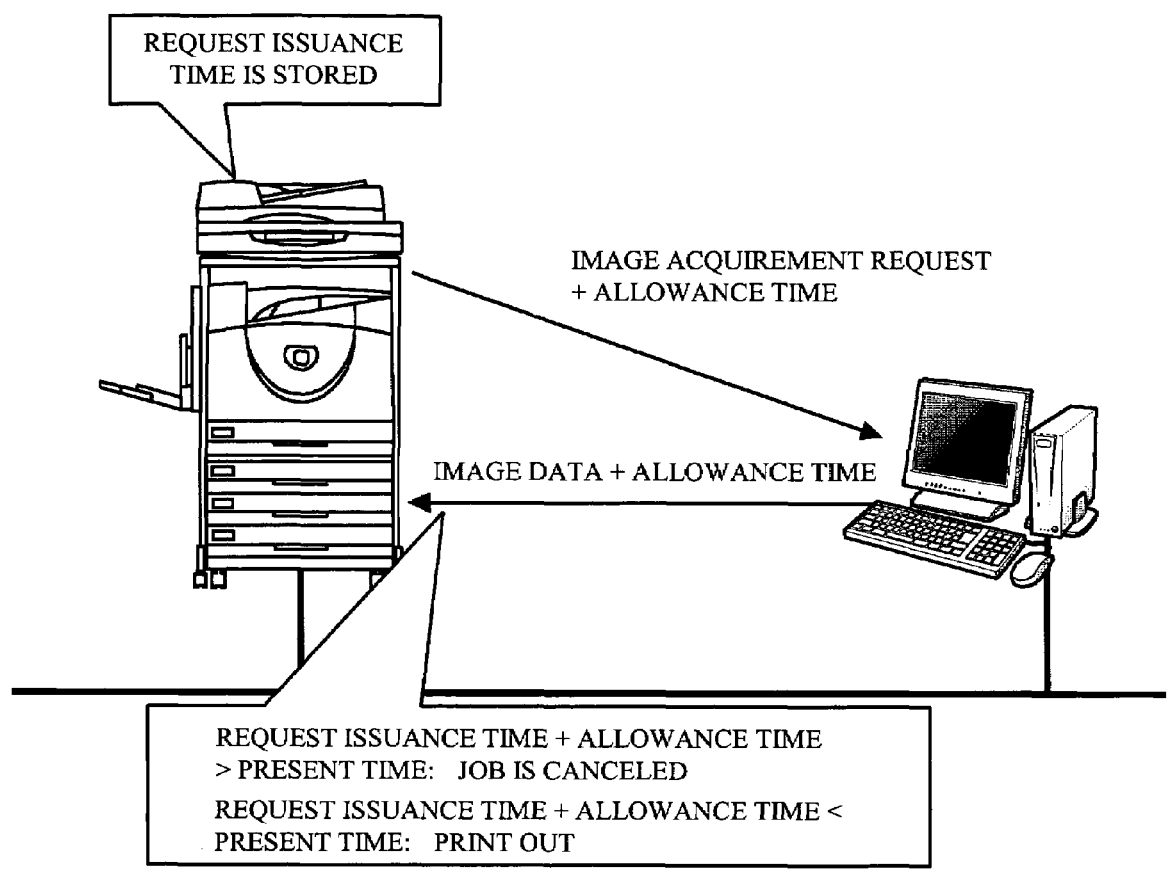
FIG. 8 schematically illustrates an operation in accordance with a third exemplary embodiment of the present invention.

FIG. 8 schematically illustrates an operation in accordance with this exemplary embodiment. In this exemplary embodiment, the request issuance time is stored in the NVRAM 14 of an image forming apparatus 1, and the allowance time is transferred to the corresponding server device 2. When the data is returned from the server device 2, the image forming apparatus 1 adds the request issuance time to the allowance time returned together with the data, and compares the time obtained through the addition with the present time, so as to determine whether the job is to be executed.

Figure 9:
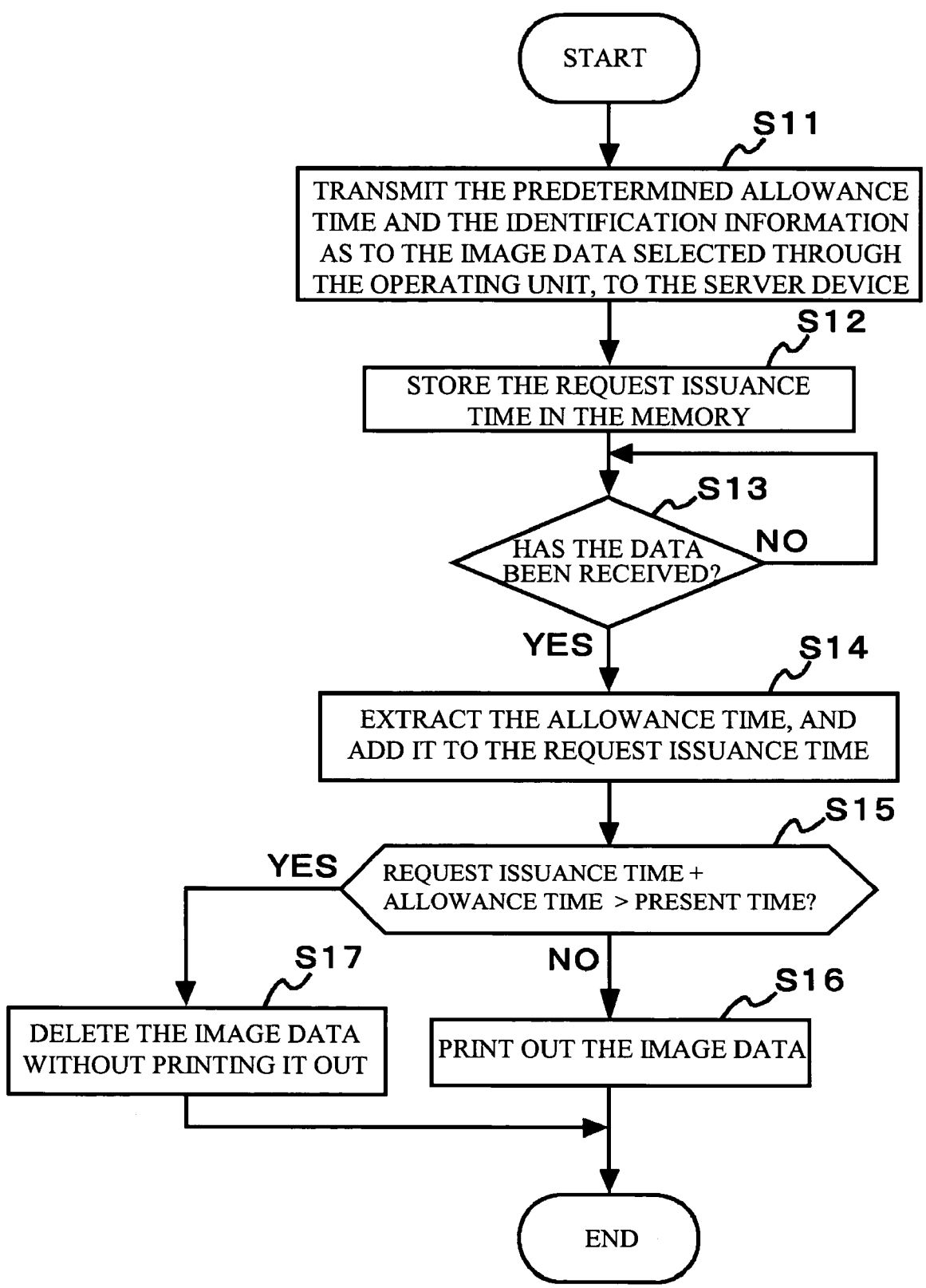
FIG. 9 is a flowchart showing the procedures in the operation in accordance with the third exemplary embodiment.

Referring now to the flowchart shown in FIG. 9, the procedures in the operation in accordance with this exemplary embodiment are described.

When image data stored in the server device 2 is selected through the operating unit 25 of the image forming apparatus 1 and a printing instruction for the image data is input, the controller 10 outputs an image acquirement request including the identification information as to the selected image data and the predetermined allowance time, to the server device 2 (step S11). The time at which the acquirement request is issued (hereinafter referred to as the request issuance time) is stored in the NVRAM 14 (step S12). In response to the image data acquirement request, the server device 2 transmits the requested image data and the allowance time, which is received from the image forming apparatus 1, to the image forming apparatus 1.

When the data is received from the server device 2 (step S13), the controller 10 extracts the allowance time from the received data, and adds the allowance time to the request issuance time stored in the NVRAM 14 (step 14). The time obtained as a result of the addition is then compared with the present time. If the time obtained as the result of the addition is ahead of the present time ("YES" in step S15), the job is not executed but is canceled (step S17). If the time obtained as the result of the addition is not ahead of the present time ("NO" in step S15), the job is executed (step S16).

The allowance time can be arbitrarily set by the user through the operating unit 25.

(Fourth Exemplary Embodiment)

Figure 10:
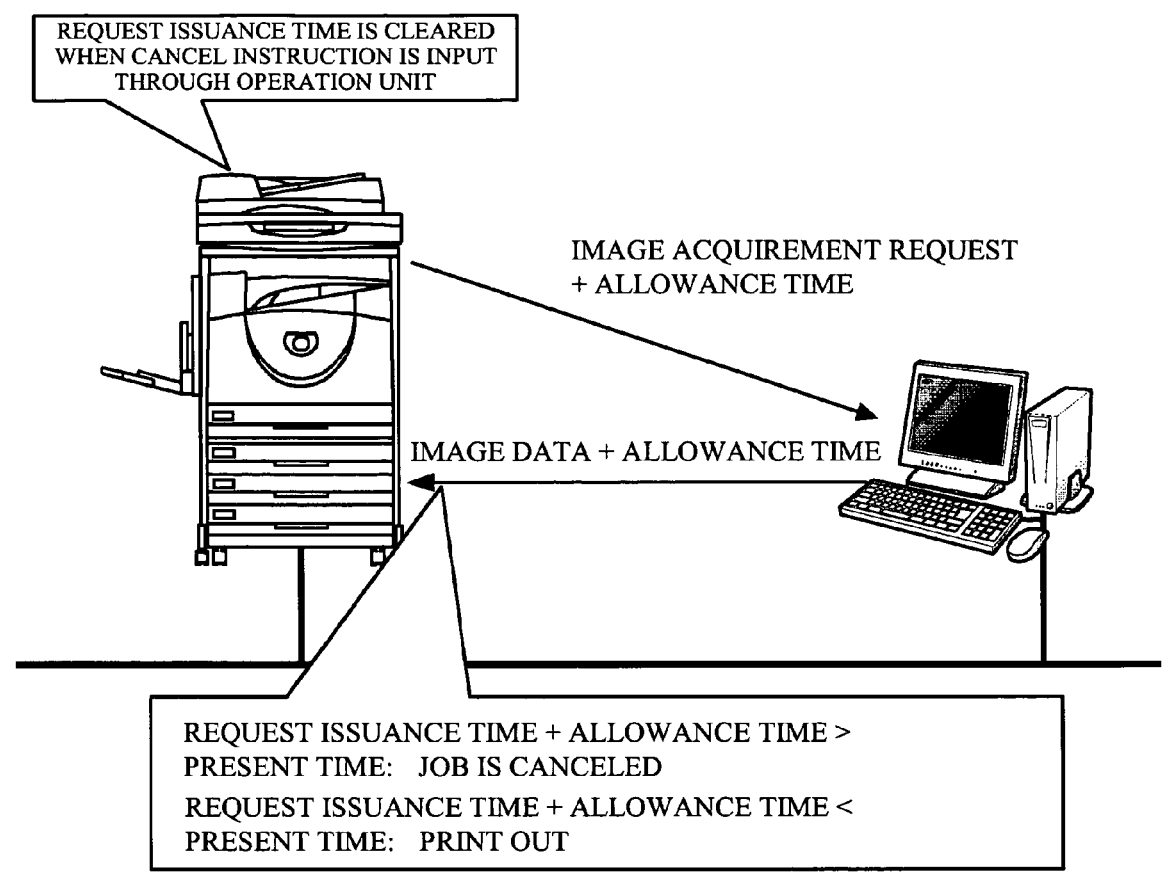
FIG. 10 schematically illustrates an operation in accordance with a fourth exemplary embodiment of the present invention.

FIG. 10 schematically illustrates an operation in accordance with this exemplary embodiment. In this exemplary embodiment, control is performed so that received image data is not output if the request issuance time stored in the NVRAM 14 is cleared by an operation through the operating unit 25 while the image forming apparatus 1 awaits image data transfer after outputting an image data acquisition request to the server device 2.

Figure 11:
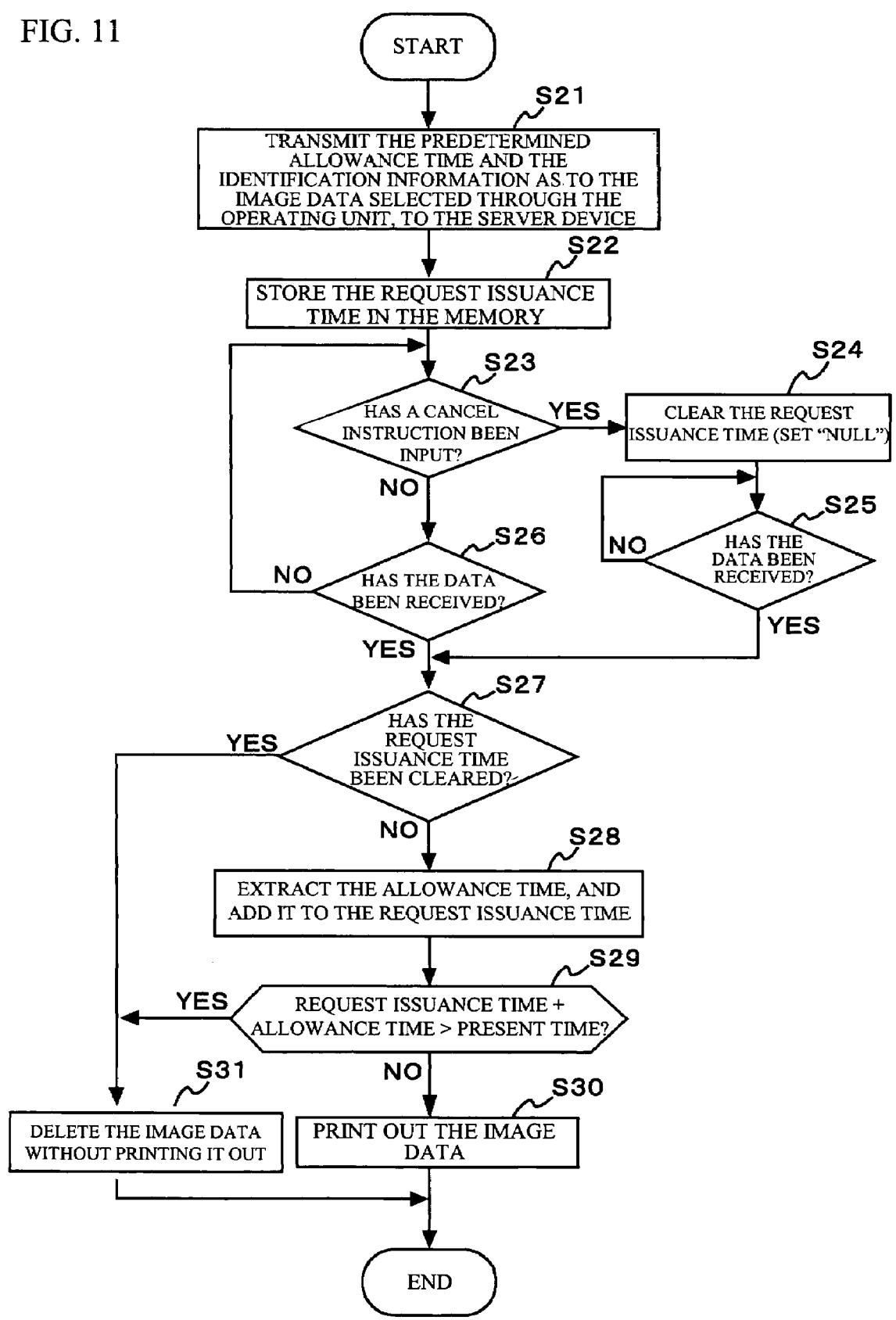
FIG. 11 is a flowchart showing the procedures in the operation in accordance with the fourth exemplary embodiment.

Referring now to the flowchart shown in FIG. 11, the procedures in the operation in accordance with this exemplary embodiment are described.

An image acquirement request including the identification information as to the selected image data and the predetermined allowance time is output to the server device 2 (step S21). The time at which the acquirement request is issued (hereinafter referred to as the request issuance time) is stored in the NVRAM 14 (step S22).

When an instruction for canceling is input through an operation of the operating unit 25 while the image forming apparatus 1 awaits data transfer from the server device 2 (step S23), the controller 10 clears the request issuance time or sets "NULL" (step S24). The image forming apparatus 1 then awaits data transfer from the server device 2 (step S25). When receiving the data from the server device 2 ("YES" in step S26 or "YES" in step S25), the controller 10 determines whether the request issuance time stored in the NVRAM 14 has been cleared (step S27). If the request issuance time is cleared or "NULL" is set ("YES" in step S27), the controller 10 does not print out the image data received from the server device 2, but deletes the image data (step S31). The procedures hereafter are the same as those of the third exemplary embodiment, and therefore, explanation of them is omitted here.

(Fifth Exemplary Embodiment)

Figure 12:
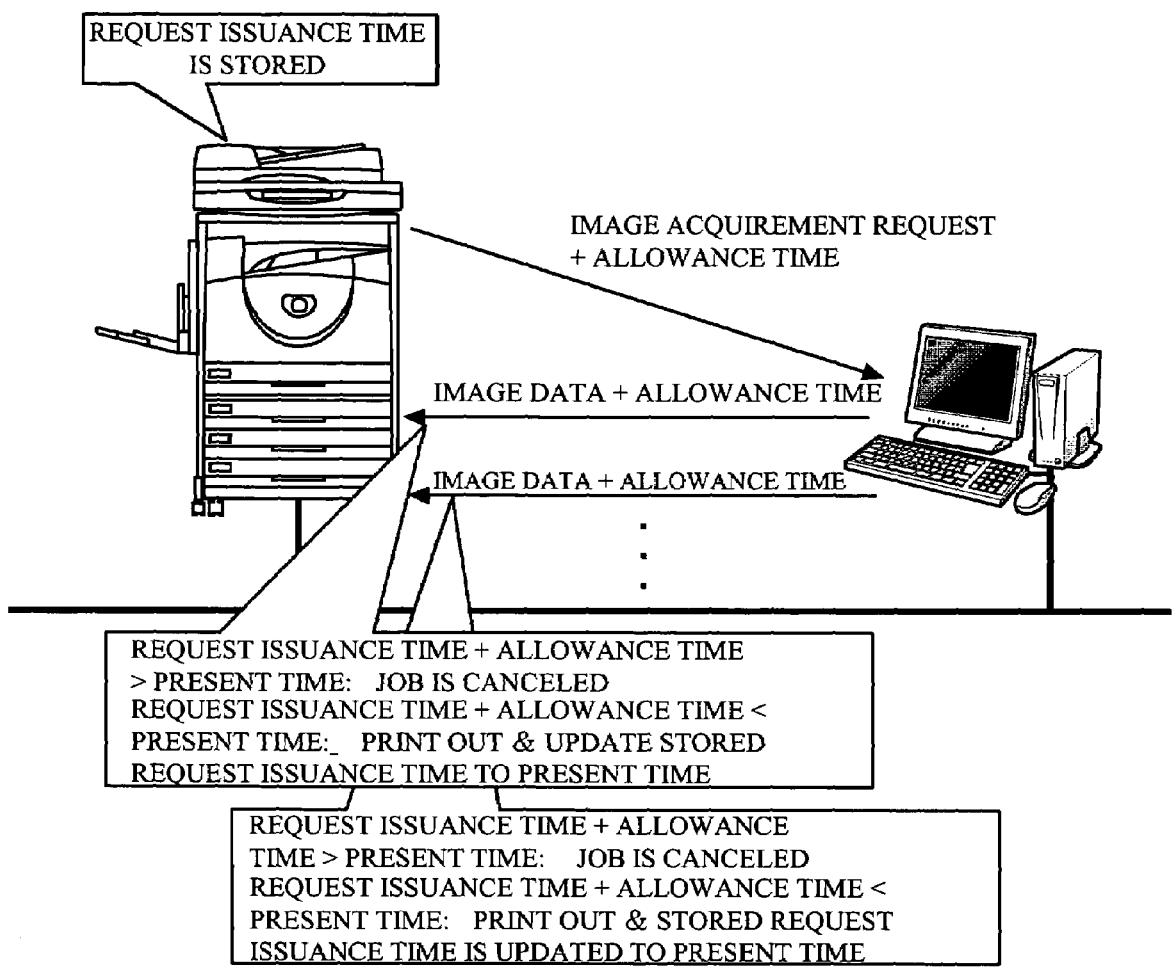
FIG. 12 schematically illustrates an operation in accordance with a fifth exemplary embodiment of the present invention.

FIG. 12 schematically illustrates an operation in accordance with this exemplary embodiment. In a case where two or more documents are obtained from the server device and are printed out, every time the reception of one document is completed, the request issuance time is updated to the time at which the reception is completed. Accordingly, the allowance time can be set for each one document. With this arrangement, there is no need to change the allowance time to collectively download a large amount of data.

Figure 13:
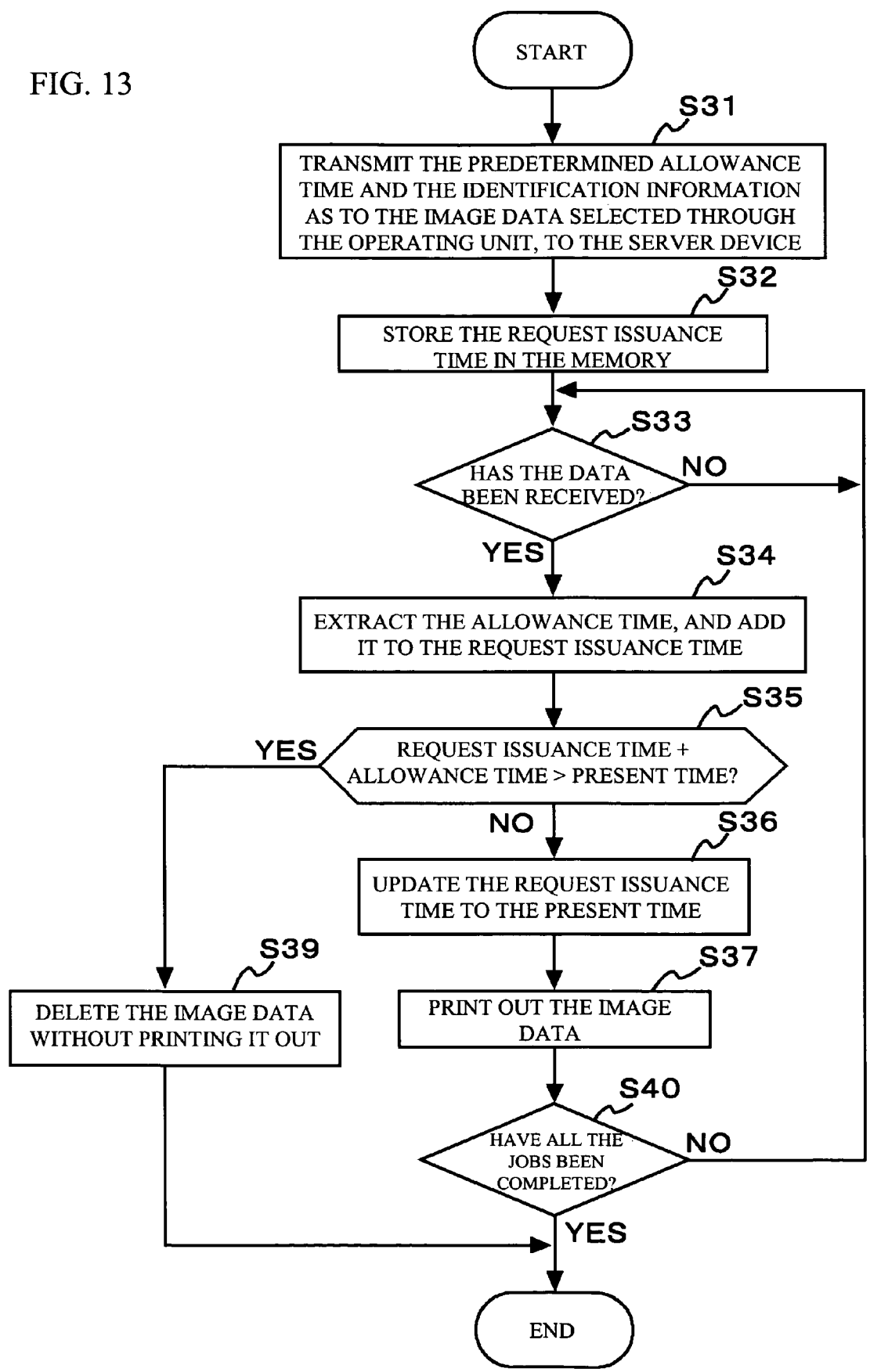
FIG. 13 is a flowchart showing the procedures in the operation in accordance with the fifth exemplary embodiment.

Referring now to the flowchart shown in FIG. 13, the procedures in the operation in accordance with this exemplary embodiment are described. As in the foregoing exemplary embodiments, the image forming apparatus 1 employed in this exemplary embodiment transmits the identification information as to the selected image data and the allowance time to the corresponding server device 2, and stores the request issuance time in the NVRAN 14. When receiving data from the server device 2 ("YES" in step S33), the controller 10 adds the request issuance time to the allowance time transferred from the server device 2, and compares the time obtained as a result of the addition with the present time (step S35). If the time obtained as a result of the addition is not ahead of the present time ("NO" in step S35), the request issuance time is updated to the present time (step S36), and the job is executed (step S37). Every time the reception of one document is completed, the request issuance time is updated to the data reception completed time. Accordingly, the allowance time can be set for each one document. When the job execution is completed, the controller 10 determines whether the jobs in response to all the requests issued to the server device 2 have been executed (step S40). In a case where not all the jobs have been executed ("NO" in step S40), the data transmitted from the server device 2 is received, and the procedures of steps S33 through S37 are repeated. In a case where all the jobs have been executed ("YES" in step S40), this operation flow comes to an end.

(Sixth Exemplary Embodiment)

In this exemplary embodiment, in a case where an instruction for changing the allowance time is input through the operating unit 25 after an image data acquirement request is issued, determination is made on whether a job is to be executed with the use of the allowance time changed upon receipt of the input.

Figure 14:
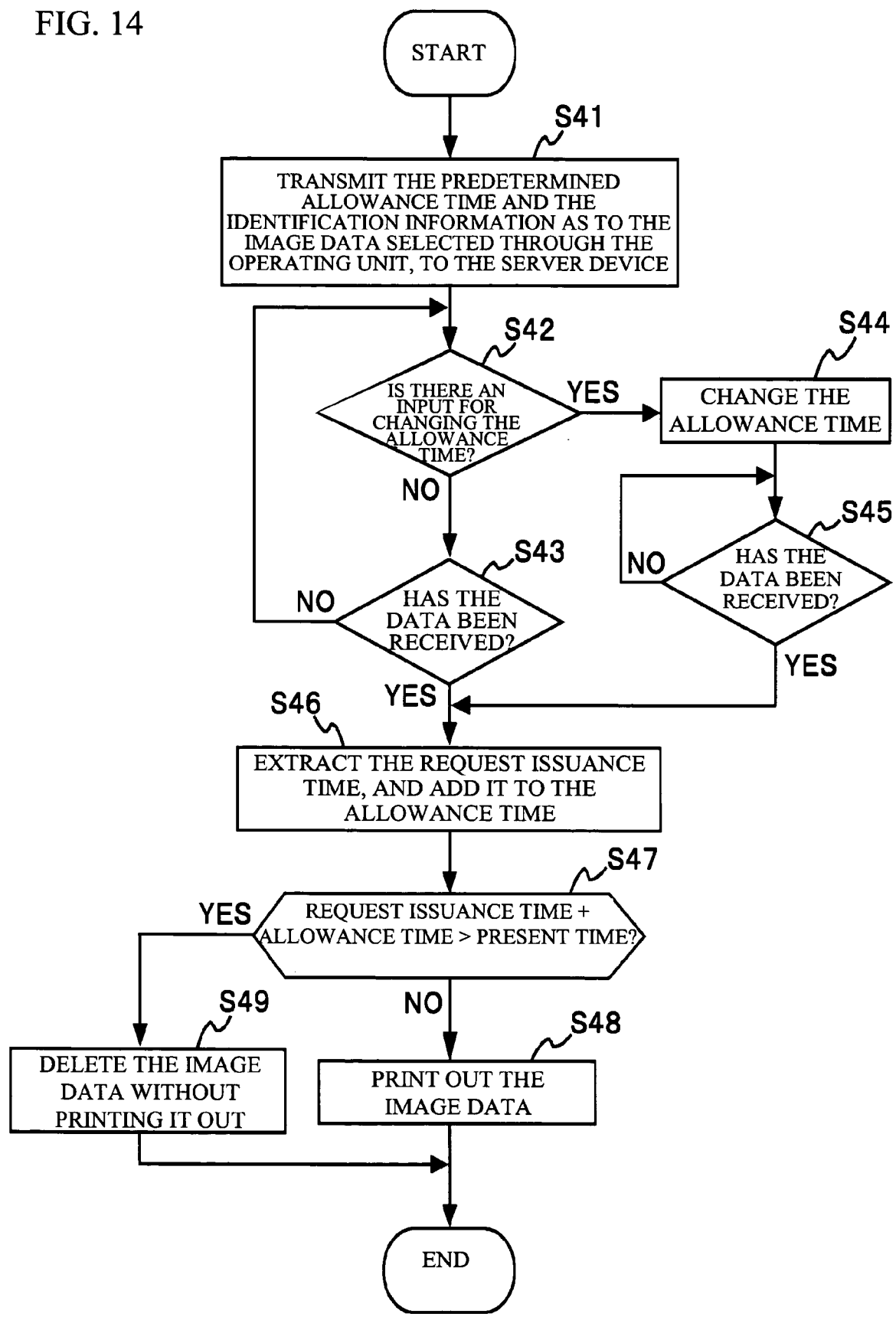
FIG. 14 is a flowchart showing the procedures in an operation in accordance with a sixth exemplary embodiment of the present invention.

Referring now to the flowchart shown in FIG. 14, the procedures in an operation in accordance with this exemplary embodiment are described. The controller 10 outputs an acquirement request including the request issuance time and the identification information as to the selected image data, to the server device 2 (step S41).

The controller 10 monitors input operations through the operating unit 25. When the allowance time is changed by an operation of the operating unit 25 (step S42), the controller 10 rewrites the allowance time stored in the NVRAM 14, and awaits data transfer from the server device 2 (step S45). When receiving the data from the server device 2 ("YES" in step S43 or "YES" in step S45), the controller 10 extracts the request issuance time from the received data, and adds the rewritten allowance time to the request issuance time. The controller 10 then compares the time obtained as a result of the addition with the present time, so as to determine whether the job is to be executed.

(Seventh Exemplary Embodiment)

Figure 15:
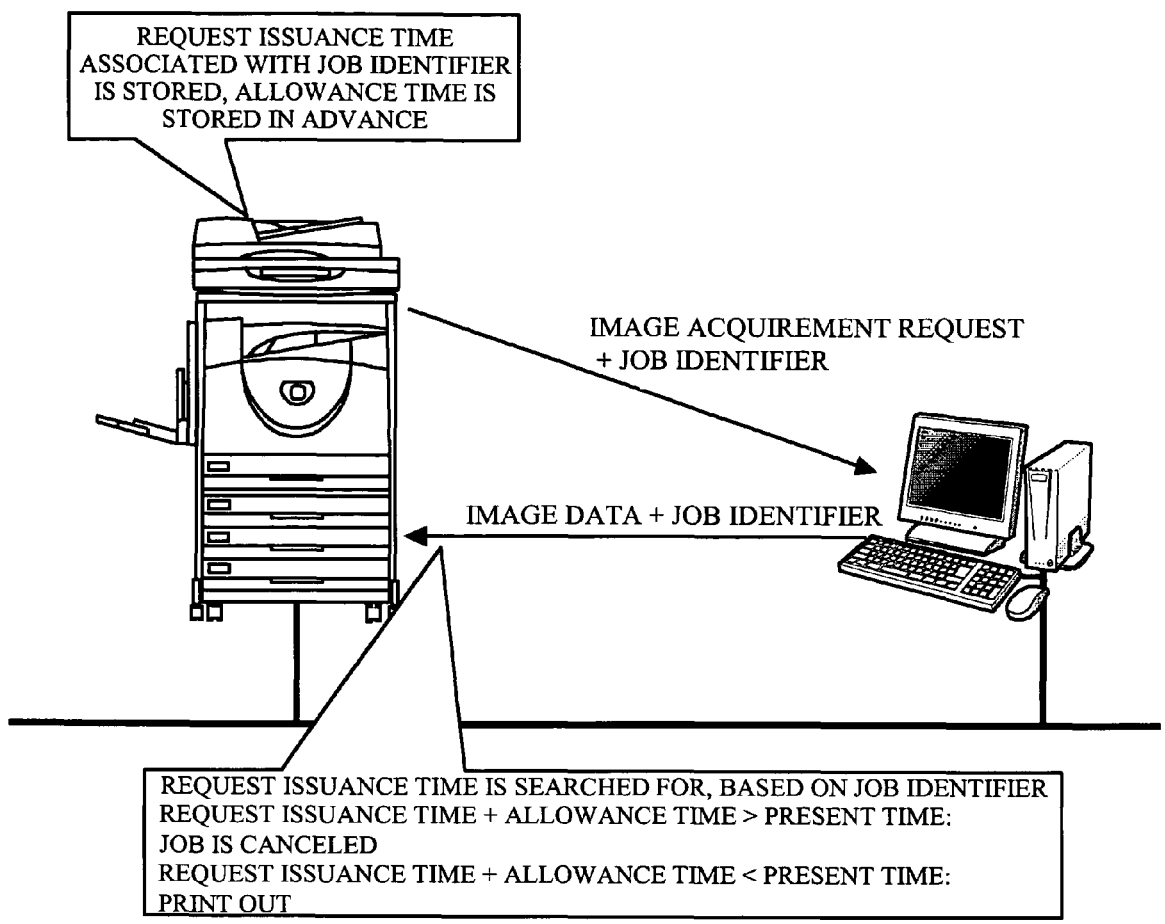
FIG. 15 schematically illustrates an operation in accordance with a seventh exemplary embodiment of the present invention.

FIG. 15 schematically illustrates an operation in accordance with this exemplary embodiment. In this exemplary embodiment, when an image data acquirement request is output to a server device 2, a job identifier for identifying the job is issued and is transmitted together with the image data acquirement request to the server device 2. In the image forming apparatus 1, the issuance time at which the acquirement request is issued is associated with the job identifier. FIG. 16 shows an example of a table that is stored in the NVRAM 14. As the image data and the job identifier are transmitted from the server device 2, the allowance time is added to the issuance time associated with the job identifier, and the time obtained as a result of the addition is compared with the present time. If the time obtained as the result of the addition is ahead of the present time, the job is not executed but is canceled. If the time obtained as the result of the addition is not ahead of the present time, the job is executed.

Figure 17:
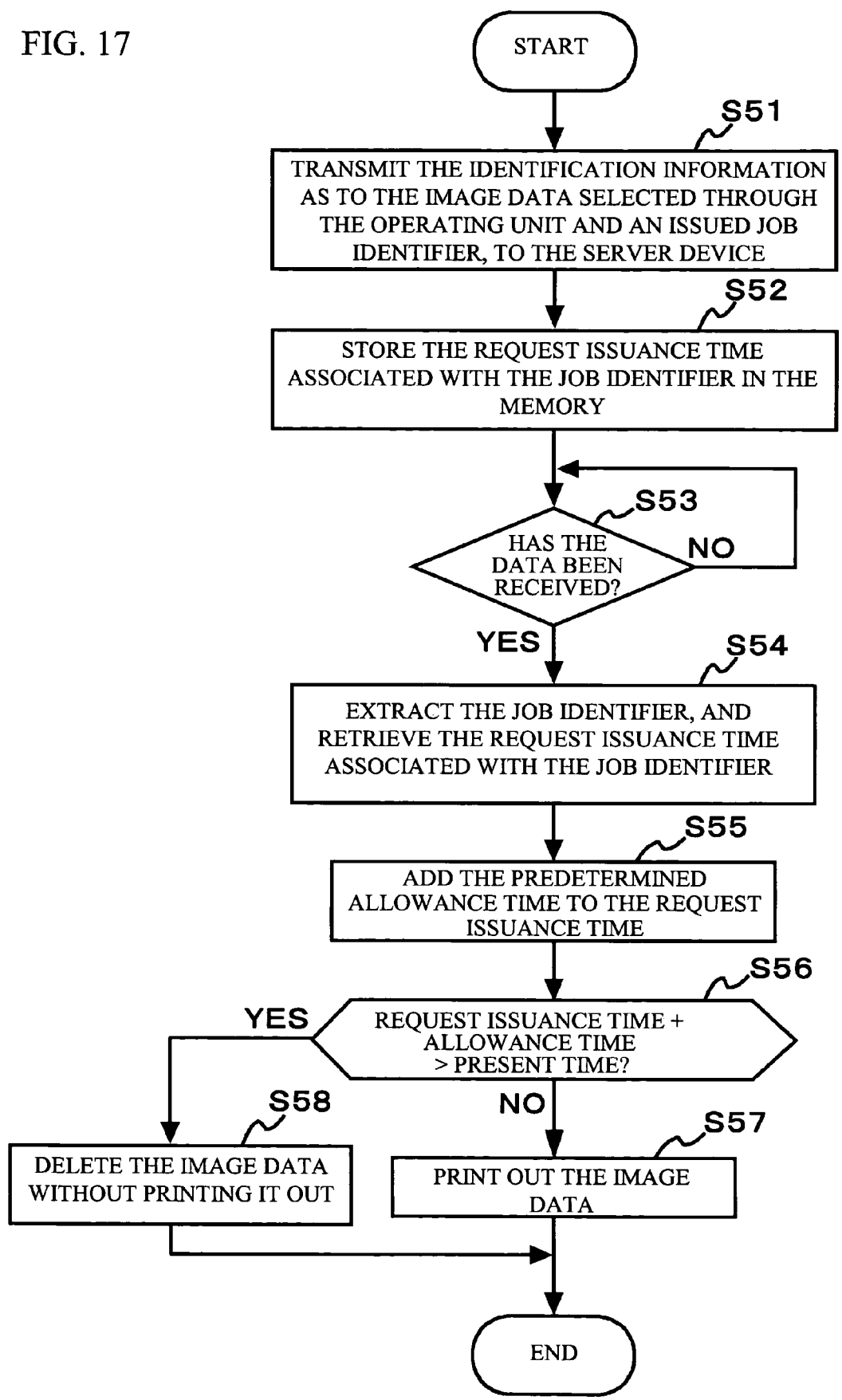
FIG. 17 is a flowchart showing the procedures in the operation in accordance with the seventh exemplary embodiment.

Referring now to the flowchart shown in FIG. 17, the procedures in the operation in accordance with this exemplary embodiment are described.

When image data stored in the server device 2 is selected through the operating unit 25 of the image forming apparatus 1 and a printing instruction for the selected image data is input, the controller 10 issues the job identifier for identifying the job, and transmits the job identifier and the identification information as to the selected image data to the server device 2 (step S51). The issuance time at which the acquirement request is issued is associated with the job identifier, and is stored in the NVRAM 14 (step S52).

Upon receipt of the image data acquirement request, the server device 2 returns the requested image data and the job identifier, which is received from the image forming apparatus 1, to the image forming apparatus 1.

Receiving the data from the server device (step S53), the controller 10 extracts the job identifier from the data received from the server device 2, and searches the NVRAM 14 so as to detect the issuance time associated with the job identifier (step S54). After detecting the issuance time, the controller 10 adds the predetermined allowance time to the issuance time (step S55), and compares the time obtained as a result of the addition with the present time (step S56). If the time obtained through the addition is ahead of the present time ("YES" in step S56), the job is not executed but is canceled. If the time obtained through the addition is not ahead of the present time ("NO" in step S56), the job is executed.

In this exemplary embodiment, the allowance time can also be arbitrarily set by the user through the operation panel.

(Eighth Exemplary Embodiment)

In this exemplary embodiment, an allowance time can be set for each one job. Therefore, request issuance times and allowance times are associated with job identifiers in the NVRAM 14, as shown in FIG. 18.

Figure 19:
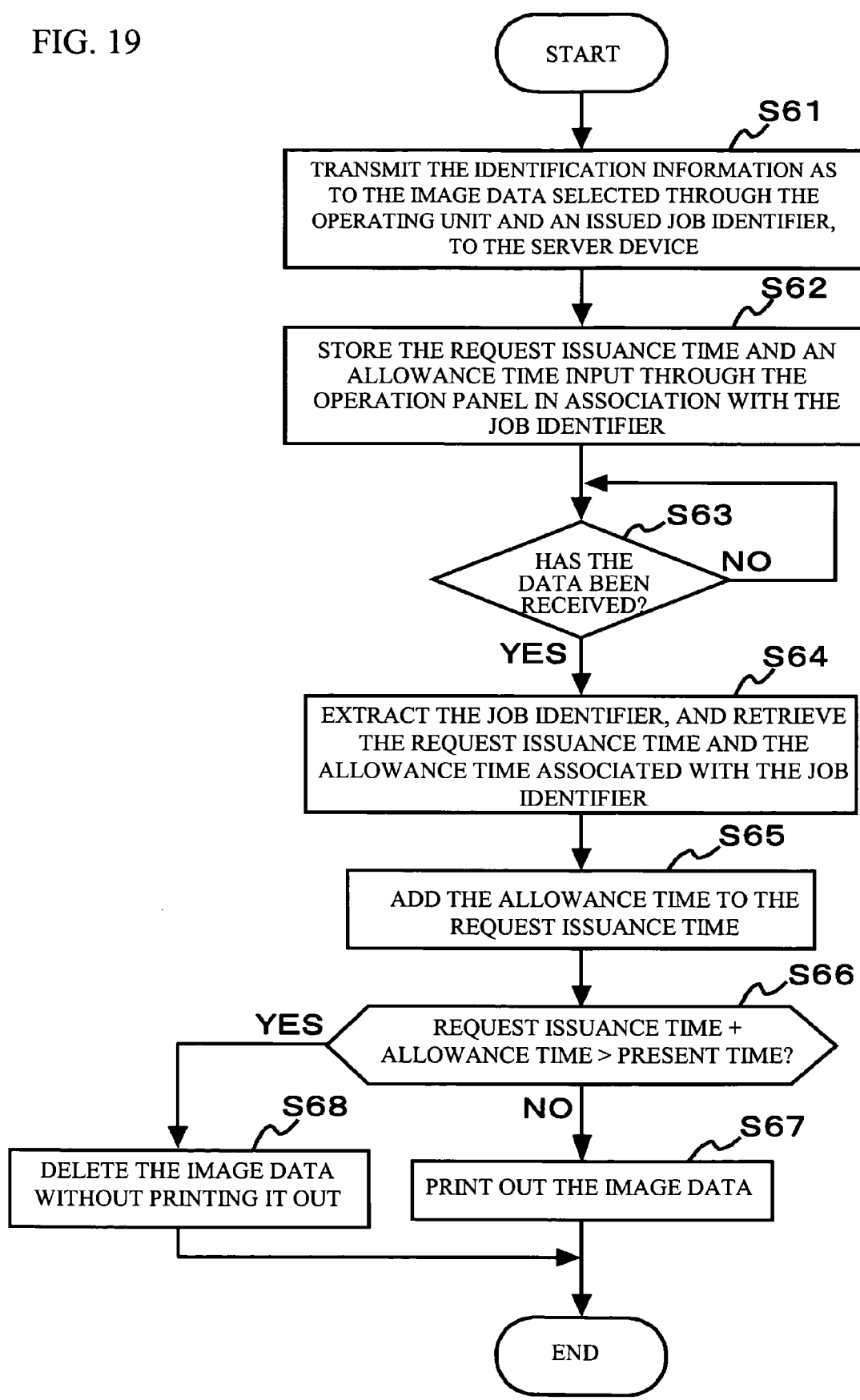
FIG. 19 is a flowchart showing the procedures in the operation in accordance with the eighth exemplary embodiment.

Referring now to the flowchart shown in FIG. 19, the procedures in the operation in accordance with this exemplary embodiment are described. When transmitting the identification information as to the selected image data and the job identifier to the server device 2 (step S61), the controller 10 associates the job identifier with the issuance time at which the request is issued and the allowance time input through the operation panel, and stores the issuance time, the allowance time, and the job identifier in the NVRAM 14 (step S62). Hereafter, upon receipt of data, the controller 10 extracts the job identifier from the data, and retrieves the request issuance time and the allowance time stored in the NVRAM 14 (step S64). The controller 10 compares the total time obtained by adding those times with the present time, so as to determine whether the job is to be executed (step S66).

The control operation in accordance with the fourth exemplary embodiment, the control operation in accordance with the fifth exemplary embodiment, and the control operation in accordance with the sixth exemplary embodiment may be performed for each job identifier.

FIG. 20 shows an example of a table formed in the NVRAM 14. A request issuance time and an allowance time are registered and managed for each one job identifier. When an instruction for canceling is input through the operating unit 25, the corresponding allowance time is cleared or is set to "NULL" as shown in FIG. 20. Accordingly, the controller 10 recognizes that the job is canceled, and stops the execution of the job.

FIG. 21 shows the history of changes made in the NVRAM 14 in a case where the request issuance time is updated every time the reception of one document is completed. In this case, every time a document is received, the request issuance time associated with the job identifier corresponding to the document is changed to the data reception time.

FIG. 22 shows the history of changes made in the NVRAM 14 in a case where an instruction for changing the allowance time is input through the operating unit 25 during a stand-by operation for data transmission. When an instruction for changing an allowance time, the allowance time associated with the corresponding job identifier is changed, as shown in FIG. 22. Upon receipt of data from the server device 2, the controller 10 uses the allowance time written in the NVRAM 14, so as to determine whether the job is to be executed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A data processing apparatus comprising:
an authentication unit that authenticates an authorized user;
a ticket generating unit that generates a job execution ticket including conditions for allowing execution of a job;
a data acquiring unit that outputs the job execution ticket, without authentication information of the authorized user, and an acquirement request for data selected by the authorized user who logs in through authentication, to an external device that is connected to a network and differs from the data processing apparatus that performs authentication, the external device transmitting an authentication failure notification to the data processing apparatus if the acquirement request is received when the external device requires authentication, and transmitting data selected by the authorized user and the job execution ticket output by the data acquiring unit to the data processing apparatus after the authentication failure notification is transmitted if authentication information of the authorized user is received from the data processing apparatus; and
a controller that allows processing of the data even after the authorized user logs out, when the data having the job execution ticket generated and output by the data processing apparatus attached thereto is returned from the external device within a predetermined period of time since the log-out, wherein
the job execution ticket contains conditions for allowing execution of a job and information including an information identifier indicating the information that is allowed by the job execution ticket, a job request identifier, a job request date indicating the date on which the job execution ticket is generated, issuer information, issuance destination information, and valid date information indicating one of (i) the date on which the job execution ticket is generated and (ii) the date on which the job execution ticket becomes invalid,
processing by the controller of the data after the authorized user logs out further requires determination that the attached job execution ticket is a valid job execution ticket, and
determination that the attached job execution ticket is valid is made based on the information included in the attached job execution ticket.

2. The data processing apparatus as claimed in claim 1, wherein the controller allows the processing of the data after authenticating the job execution ticket transferred from the external device.

3. The data processing apparatus as claimed in claim 1, wherein the ticket generating unit generates the job execution ticket including at least identification information as to the device that has issued the job execution ticket, the user ID of the authorized user who has logged in, and the issue date of the job execution ticket.

4. A job execution system comprising:
a data processing apparatus; and
an external device that attaches a job execution ticket to requested data upon receipt of an acquirement request for data and the job execution ticket from the data processing apparatus, and transfers the requested data to the data processing apparatus, the data processing apparatus includes:

an authentication unit that authenticates an authorized user;

a ticket generating unit that generates the job execution ticket including conditions for allowing execution of a job;

a data acquiring unit that outputs the job execution ticket, without authentication information of the authorized user, and the acquirement request for data selected by the authorized user who logs in through authentication, to the external device that is connected to a network and differs from the data processing apparatus that performs authentication, the external device transmitting an authentication failure notification to the data processing apparatus if the acquirement request is received when the external device requires authentication, and transmitting data selected by the authorized user and the job execution ticket output by the data acquiring unit to the data processing apparatus after the authentication failure notification is transmitted if authentication information of the authorized user is received from the data processing apparatus; and a controller that allows processing of the data even after the authorized user logs out, when the data having the job execution ticket generated and output by the data processing apparatus attached thereto is returned from the external device within a predetermined period of time since the log-out, wherein the job execution ticket contains conditions for allowing execution of a job and information including an information identifier indicating the information that is allowed by the job execution ticket, a job request identifier, a job request date indicating the date on which the job execution ticket is generated, issuer information, issuance destination information, and valid date information indicating one of (i) the date on which the job execution ticket is generated and (ii) the date on which the job execution ticket becomes invalid, processing by the controller of the data after the authorized user logs out further requires determination that the attached job execution ticket is a valid job execution ticket, and determination that the attached job execution ticket is valid is made based on the information included in the attached job execution ticket.

5. A job execution method comprising:

authenticating an authorized user;

generating a job execution ticket including conditions for allowing execution of a job;

outputting the job execution ticket, without authentication information of the authorized user, and an acquirement request for data selected by the authorized user who logs in through authentication, to an external device that is connected to a network and differs from a data processing apparatus that performs the authentication, the external device transmitting an authentication failure notification to the data processing apparatus if the acquirement request is received when the external device requires authentication, and transmitting data selected by the authorized user and the job execution ticket output by the data acquirement unit to the data processing apparatus after the authentication failure notification is transmitted if authentication information of the authorized user is received from the data processing apparatus; and allowing processing of the data even after the authorized user logs out, when the data having the job execution ticket attached thereto is returned from the external device within a predetermined period of time since the log-out, wherein the job execution ticket contains conditions for allowing execution of a job and information including an information identifier indicating the information that is allowed by the job execution ticket, a job request identifier, a job request date indicating the date on which the job execution ticket is generated, issuer information, issuance destination information, and valid date information indicating one of (i) the date on which the job execution ticket is generated and (ii) the date on which the job execution ticket becomes invalid, processing of the data after the authorized user logs out further requires determination that the attached job execution ticket is a valid job execution ticket, and determination that the attached job execution ticket is valid is made based on the information included in the attached job execution ticket.

* * * * *